US010276271B2

(12) United States Patent
McClure et al.

(10) Patent No.: US 10,276,271 B2
(45) Date of Patent: Apr. 30, 2019

(54) ELECTRIC FISSION REACTOR FOR SPACE APPLICATIONS

(71) Applicant: Triad National Security, LLC, Los Alamos, NM (US)

(72) Inventors: Patrick Ray McClure, Los Alamos, NM (US); David Duff Dixon, Elder, SD (US); David Irvin Poston, Los Alamos, NM (US); Lee Mason, North Royalton, OH (US); Marc Gibson, Medina, OH (US)

(73) Assignee: Triad National Security, LLC., Los Alamos, NM (US)

( * ) Notice: Subject to any disclaimer, the term of this patent is extended or adjusted under 35 U.S.C. 154(b) by 832 days.

(21) Appl. No.: 14/770,894

(22) PCT Filed: Mar. 26, 2014

(86) PCT No.: PCT/US2014/031874
§ 371 (c)(1),
(2) Date: Aug. 27, 2015

(87) PCT Pub. No.: WO2014/204543
PCT Pub. Date: Dec. 24, 2014

(65) Prior Publication Data
US 2016/0012924 A1    Jan. 14, 2016

Related U.S. Application Data

(60) Provisional application No. 61/816,048, filed on Apr. 25, 2013.

(51) Int. Cl.
*G21C 1/02*    (2006.01)
*G21C 15/257*    (2006.01)
(Continued)

(52) U.S. Cl.
CPC .............. *G21C 15/257* (2013.01); *G21C 1/02* (2013.01); *G21C 1/32* (2013.01); *G21C 3/04* (2013.01);
(Continued)

(58) Field of Classification Search
CPC .......... G21C 1/02; G21C 1/32; G21C 15/257; G21C 11/06; G21C 3/08; G21C 3/04; G21C 3/40; G21H 1/00; G21H 3/00; G21D 5/02
See application file for complete search history.

(56) References Cited

U.S. PATENT DOCUMENTS 3,709,781 A * 1/1973 Fiebelmann ......... G21C 15/257
165/47
4,569,820 A * 2/1986 Fortescue ................ G21C 3/00
376/381

(Continued)

OTHER PUBLICATIONS

Mason, Lee, and Chad Carmichael. "Mason." "A small fission power system with Stirling power conversion for NASA science missions." NASA/TM 2011-217204. (2011).11 pages. <https://ntrs.nasa.gov/archive/nasa/casi.ntrs.nasa.gov/20120001793.pdf>.*

(Continued)

*Primary Examiner* — Jack W Keith
*Assistant Examiner* — Lily C Garner
(74) *Attorney, Agent, or Firm* — LeonardPatel PC

(57) ABSTRACT

Embodiments of the present invention pertain to a power system utilizing a uranium-based reactor for space missions. For example, the power system may include a reactor configured to generate thermal energy using a uranium core. A plurality of heat pipes may be configured to transfer thermal energy from the reactor core to a plurality of Stirling engines to generate electricity for a spacecraft.

18 Claims, 7 Drawing Sheets

(51) Int. Cl.

| | |
|---|---|
| *G21C 1/32* | (2006.01) |
| *G21C 3/04* | (2006.01) |
| *G21C 3/22* | (2006.01) |
| *G21C 7/08* | (2006.01) |
| *G21C 11/06* | (2006.01) |
| *G21C 15/04* | (2006.01) |
| *G21D 5/02* | (2006.01) |
| *G21H 1/00* | (2006.01) |
| *G21H 3/00* | (2006.01) |
| *G21C 3/08* | (2006.01) |
| *G21C 3/40* | (2006.01) |

(52) U.S. Cl.
 CPC ............ *G21C 3/22* (2013.01); *G21C 7/08* (2013.01); *G21C 11/06* (2013.01); *G21C 15/04* (2013.01); *G21D 5/02* (2013.01); *G21H 1/00* (2013.01); *G21H 3/00* (2013.01); G21C 3/08 (2013.01); G21C 3/40 (2013.01); Y02E 30/34 (2013.01); Y02E 30/39 (2013.01)

(56) References Cited

U.S. PATENT DOCUMENTS

| | | | | |
|---|---|---|---|---|
| 5,299,242 A | * | 3/1994 | Jacox | ............ G21C 7/28 376/220 |
| 5,428,653 A | * | 6/1995 | El-Genk | ............ G21C 1/07 376/318 |
| 2005/0089130 A1 | | 4/2005 | Moriarty | |

OTHER PUBLICATIONS

Mason et al. "Mason772". "Fission surface power system initial concept definition." NASA/TM 2010-216772. Ohio: National Aeronautics and Space Administration and Department of Energy 864 (2010).56 pages. <https://ntrs.nasa.gov/archive/nasa/casi.ntrs.nasa.gov/20100033102.pdf>.*

Mason, Lee, et al. "Mason099". "A small fission power system for NASA planetary science missions." NASA/TM 2011-217099. (2011). 25 pages. <https://ntrs.nasa.gov/archive/nasa/casi.ntrs.nasa.gov/20120000789.pdf>.*

David I. Poston et al., "A Simple, Low-Power Fission Reactor for Space Exploration Power Systems", issued on Feb. 25-28, 2013, in Albuquerque, New Mexico.

Lee Mason et al., "A Small Fission Power System with Stirling Power Conversion for NASA Science Missions", issued on Dec. 2011 at Glenn Research Center, Cleveland, Ohio.

Lee W. Young, "International Search Report" for PCT/US2014/0031874 dated Dec. 2, 2014.

Lee W. Young, "Written Opinion" for PCT/US2014/0031874 dated Dec. 2, 2014.

You Tube, "Small Reactor for Deep Space Exploration", published on Nov. 29, 2012.

YouTube Video, accessible on https://www.youtube.com/watch?v=KobRfGqlpGc, published on Nov. 29, 2012.

\* cited by examiner

ELECTRIC FISSION REACTOR FOR SPACE APPLICATIONS

CROSS-REFERENCE TO RELATED APPLICATION

This application is a U.S. National Stage Application under 35 U.S.C. § 371 of International Application No. PCT/US2014/031874, filed on Mar. 26, 2014, which claims the benefit of U.S. Provisional Patent Application No. 61/816,048, filed on Apr. 25, 2013. The subject matter of these earlier filed applications is hereby incorporated herein by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to power systems and, more particularly, to a relatively small reactor for powering spacecraft.

BACKGROUND

Deep space science missions explore the underlying fabric of the universe. Some of these missions provide data pertaining to giant gaseous planets, such as Jupiter and Saturn, as well as their moons. Some deep space missions may also provide data pertaining to other solar system objects, such as asteroids and comets. These missions may also be vital to understanding the origin of the universe.

Historically, deep space missions have relied upon radioisotope power systems to provide power because solar power is generally not practical with conventional solar technology beyond Mars. The principal nuclear isotope that powers these systems is Plutonium-238. However, there is currently a shortage of Plutonium-238. To reduce reliance on Plutonium-238 and to enhance deep space exploration capabilities, an improved small uranium-based reactor may be beneficial.

SUMMARY

Certain embodiments of the present invention may provide solutions to the problems and needs in the art that have not yet been fully identified, appreciated, or solved by conventional reactor technologies. For example, some embodiments of the present invention pertain to a power system utilizing a uranium-based reactor for missions instead of radioisotope power systems. The power system of some embodiments is safe, easy to manufacture, and may be built using materials located within the United States. Furthermore, to reduce the risk of loss of life or contamination, the power system of some embodiments does not operate until the power system reaches space.

In one embodiment, an apparatus is provided. The apparatus includes a reactor that is configured to generate thermal energy using a reactor core. The apparatus also includes a plurality of heat pipes configured to transfer the thermal energy from the reactor core to a plurality of Stirling engines to generate electricity for a spacecraft.

In another embodiment, an apparatus is provided. The apparatus includes a plurality of engines to produce electricity for a spacecraft. The apparatus also includes a plurality of heat pipes. Each of the plurality of heat pipes is operably connected to a reactor core at one end and operably connected to one of the plurality of engines at another end. The plurality of heat pipes are configured to transfer thermal energy from the reactor core to the plurality of engines.

In yet another embodiment, an apparatus is provided. The apparatus include a plurality of heat pipes configured to transfer thermal energy from a uranium enriched reactor to a plurality of Stirling engines. The uranium enriched reactor includes a uranium core configured to generate thermal energy when a rod is removed from the uranium enriched reactor.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

Some embodiments of the present invention pertain to a reactor power system for spacecraft. The reactor power system may include a reactor core, a core reflector, a rod to start the reactor, a plurality of heat pipes to transfer thermal energy, radiation shielding to protect electronics, and a plurality of Stirling engines to power (e.g., provide electricity for) the spacecraft.

In some embodiments, the power source may be a cylinder of enriched uranium. A beryllium reflector may surround the power source. A single rod of boron carbide may turn the reactor on and off. The reactor may self-regulate the fission reactions and eliminate the need for complicated control systems. For example, the self-regulating feature of the reactor may require no control after startup and adjust to changes in demand from a power conversion system such as Stirling Engines. This feature may allow the reactor power to adjust to the demand for power from the Stirling Engines. Radioisotope power generators in conventional systems cannot adjust to such changes in the power conversion system.

Embedded within the beryllium reflector are heat pipes. The heat pipes are configured to transfer the thermal energy produced in the reactor core. Heat pipes may be passive heat pipes that efficiently transfer the thermal energy. In certain embodiments, the heat pipes are composed of corrosion-resistant, super-alloy steel and a small amount of sodium, potassium, or another liquid metal as would be appreciated by a person of ordinary skill in the art. Each of the heat pipes is connected to one of the Stirling engines in some embodiments.

A radiation shield positioned between the reactor core and the Stirling engines may be configured to protect the electronics of the Stirling engines and the spacecraft, including guidance electronics and scientific instruments. The Stirling engines may be configured to produce the electricity for the spacecraft. For example, in certain embodiments, the Stirling engines may produce at least 500 watts of power.

The reactor system of some embodiments provides many advantages over conventional systems. For example, because the reactor of some embodiments does not operate until the spacecraft is in space, accidents on the ground during launch may have minimal effect. The reactor system of some embodiments may be scaled up to more challenging applications, such as surface power sources on Mars or spacecraft propulsion using electrically-driven ion thrusters.

Figure 1A:
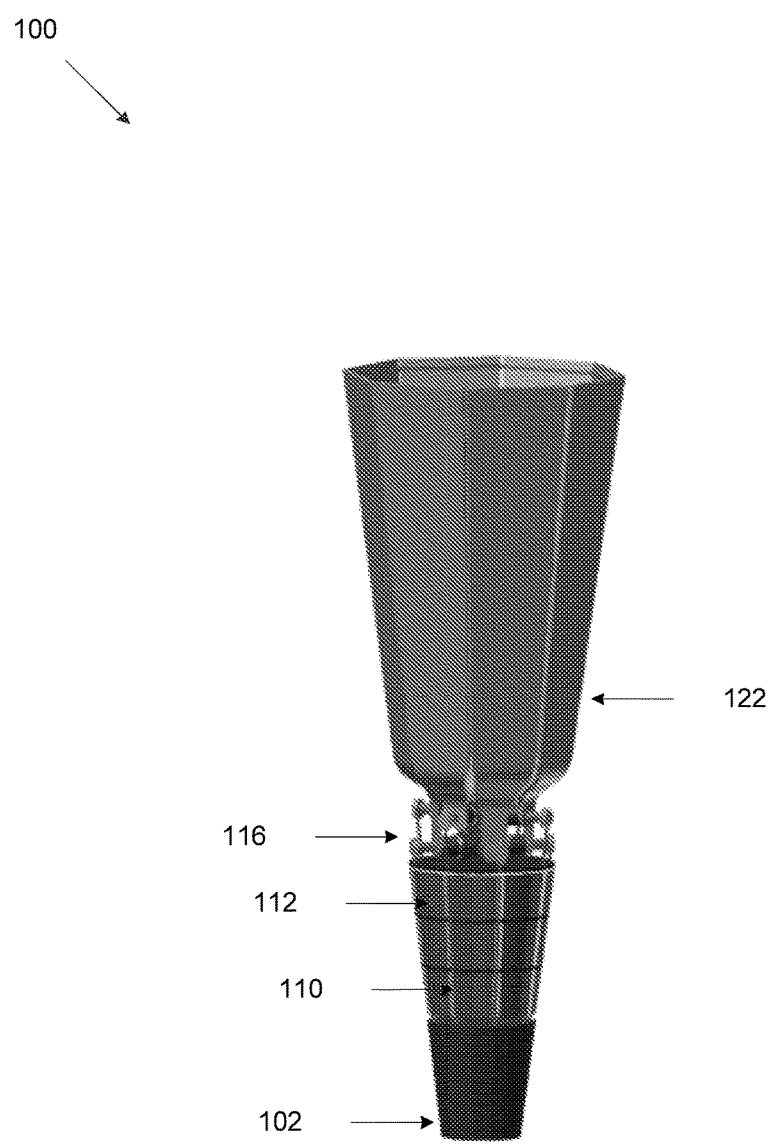
FIG. 1A illustrates a power system, according to an embodiment of the present invention.

FIG. 1A illustrates a power system 100, according to an embodiment of the present invention. Power system 100 includes a reactor 102. In this embodiment, power system 100 may be constructed along a major axis of the spacecraft allowing power system 100 to fit within a rocket shroud and survive the g-forces of launch and deployment.

Figure 1B:
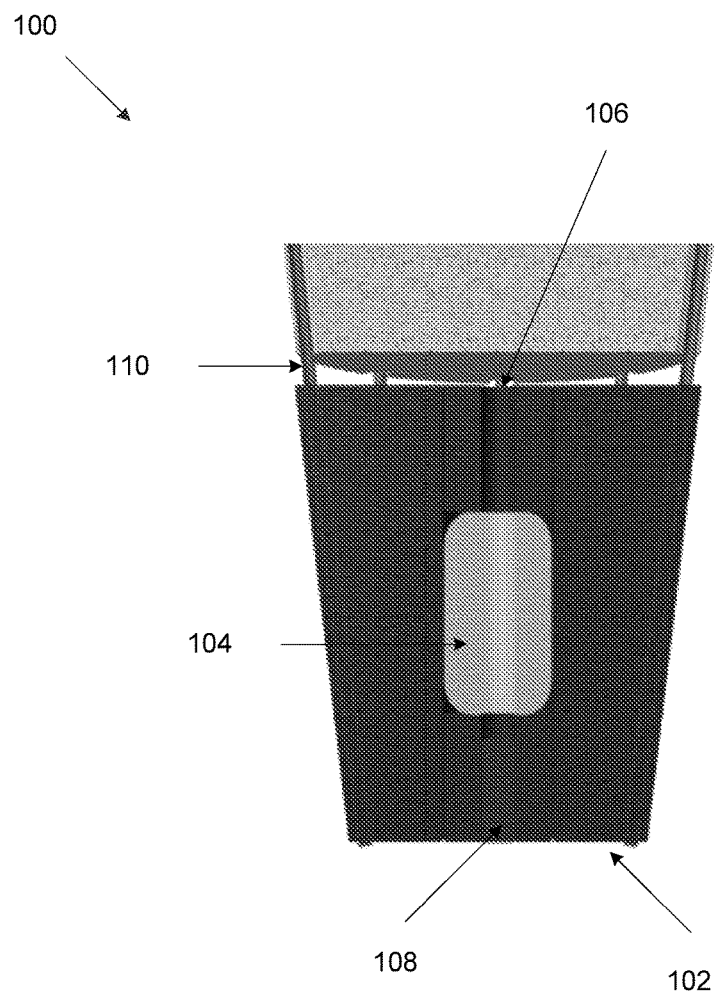
FIG. 1B illustrates a cross-sectional view of a reactor of the power system, according to an embodiment of the present invention.

FIG. 1B is a cross-sectional view of reactor 102 of power system 100, according to an embodiment of the present invention. In FIG. 1B, reactor 102 surrounds a reactor core 104, e.g., an enriched uranium core. Reactor core 104 includes nuclear fuel to drive the spacecraft. It should be appreciated that higher uranium loading may enable a smaller core, which has multiple advantages. These advantages may include, but are not limited to, lower fuel mass, a smaller and lower mass reflector and shield, shorter heat conduction paths, and easier fabrication and transport.

Reactor 102 may be composed of beryllium. This allows reactor 102 to act as a reflector, and provides reactor core 104 with sufficient reactivity to cause reactor core 104 to generate energy, i.e., reflect neutrons towards reactor core 104. Reactor 102 may include a boron carbide rod 108 to activate and deactivate reactor 102, essentially powering reactor 102 on and off. Depending on the configuration of the power system, boron carbide rod (also known as the "on and off" rod) 108 may move up out of and down into, or thread into and out of, a cylinder 106. In some embodiments, when boron carbide rod 108 moves into cylinder 106, reactor 102 is turned on, and when boron carbide rod 108 moves out of cylinder 106, reactor 102 is turned off. In certain embodiments, when a threaded cylinder is used, boron carbide rod (or threaded rod) 108 may move into and out of reactor core 104 using a rotating drive (not shown). The threaded rod allows boron carbide rod 108 to stay embedded within the core cylinder during an extreme impact that strips the threads and removes the rod. Having boron carbide rod 108 in place prevents reactor 102 from reaching a critical state (i.e. turning on) during an accident. In other embodiments, a smooth cylinder with a gap between boron carbide rod 108 and reactor core 104 may be utilized.

In some embodiments, as boron carbide rod 108 is slowly withdrawn, reactor core 104 may start fission on its own. Fission may not occur until boron carbide rod 108 is pulled far enough so that reactor 102 reaches a critical state. It should be noted that when fission starts to occur, boron carbide rod 108 may be partially located within reactor core 104. Also, fission may start by a stray neutron. As boron carbide rod 108 continues to be pulled out of reactor core 104, reactor core 104 heats up. The heating process reduces the reactivity in reactor core 104 (e.g., as reactor core 104 expands, more neutrons leak out and don't fission). After boron carbide rod 108 is completely pulled out of reactor core 104, a balance (or equilibrium) is reached between the neutrons that are produced and the neutrons that have leaked out. This equilibrium will continue until the system is disturbed.

The rotating drive (not shown), i.e., the motor that drives rod 108, may be placed on either side of reactor core 104. However, due to concerns of radiation doses to the rotating drive, the rotating drive is generally placed on the far side of a radiation shield 112. Because embodiments described herein may use a lower power concept, the rotating drive may also be placed below reactor core 104.

It should be appreciated that in order to "start" reactor 102, rod 108 may be withdrawn in small increments by the rotating drive until initial supercriticality is achieved. The reactor power may increase exponentially until reactor 102 starts to heat up, at which point natural reactivity feedback will begin to reduce the level of supercriticality. In the absence of rod 108 or power conversion system action, reactor 102 may oscillate slowly to a stable, critical point at low power. This process may be expedited by movements of rod 108 to mitigate overshoot and undershoot using the appropriate instruments and controls. The process of withdrawing rod 108 may continue until the desired operating temperature is achieved. At some point during the rod removal process, heat pipes 110 may reach a sufficiently high temperature to cause the thermal energy to be transferred from reactor core 104 to Stirling engines 116. See FIG. 1C.

Once power system 100 reaches a steady state, the power from reactor 102 may passively generate heat that powers Stirling engines 116. Reactor 102 may include a liner (not shown) to prevent material interactions. Reactor 102 may also self-regulate the fission reactions and eliminate the need for complicated control systems. For example, if power demand increases, reactor 102 may be configured to decrease in temperature adding additional reactivity to cause reactor power to increase, matching the demand for more power. If the power demand decreases, however, reactor 102 is configured to increase in temperature lowering reactor power to accommodate for the lower demand of power. Stated differently, reactor 102 is configured to increase or decrease reactivity depending on the power demand.

Also, instead of using complex coolant loops within reactor 102, heat pipes 110 are used for cooling purposes in some embodiments. For example, heat pipes 110 may be embedded within reactor 102 and act as passive heat removal devices that efficiently transfer thermal energy. See, for example, FIG. 1C. In some embodiments, heat pipes 110 may be placed near reactor core 104, increasing the temperature of heat pipes 110 and improving the efficiency of Stirling engines 116. It should be appreciated that depending on the structural requirements, heat pipes 110 may be placed within reactor core 104 or between an outer wall of reactor 102 and outside of reactor core 104. In certain embodiments, heat pipes 110 may be composed of stainless steel with sodium or another liquid metal as the working fluid.

Figure 1C:
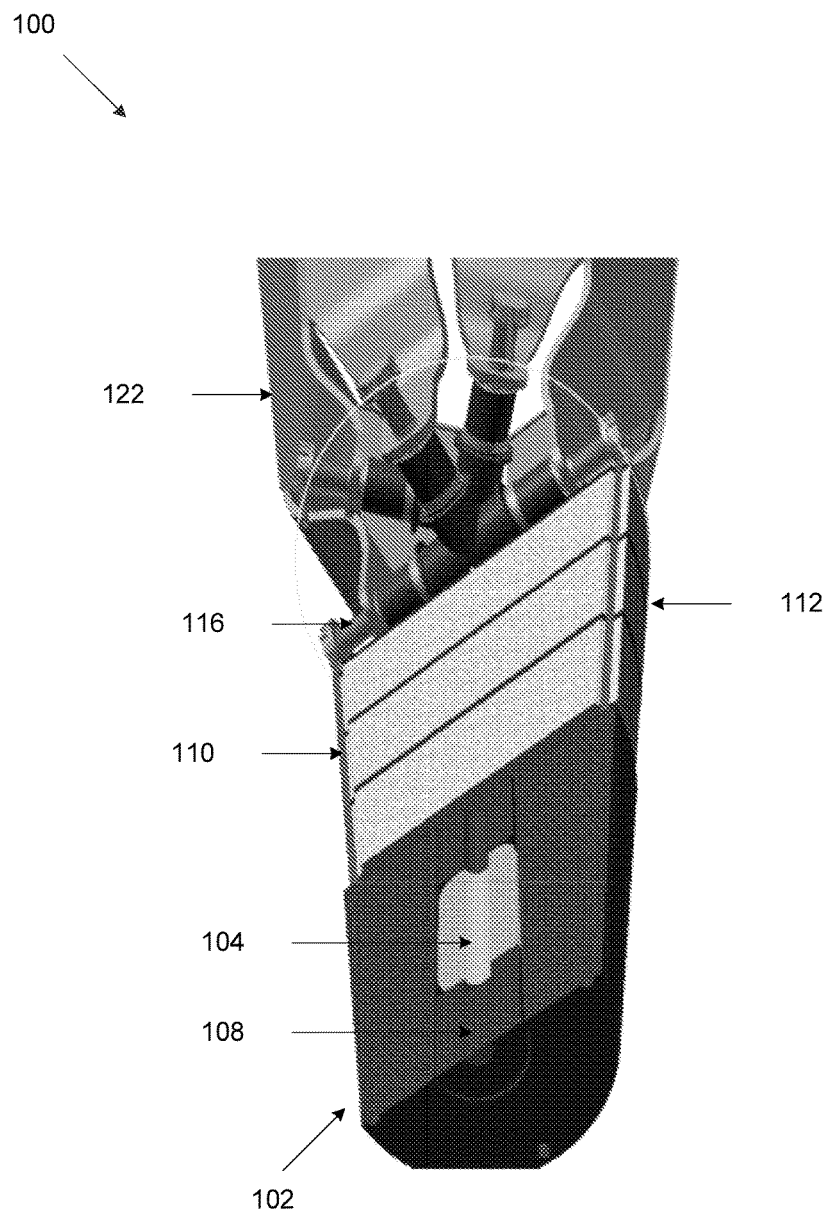
FIG. 1C illustrates a cross-sectional view of the power system, according to an embodiment of the present invention.

As shown in FIG. 1C, heat pipes 110 may extend from reactor 102 into Stirling engines 116. Heat pipes 110 pass through radiation shield 112. Radiation shield 112 may absorb gamma rays and neutrons emitted from reactor 102 to prevent damage to the sensitive electronics in Stirling engine 116. In certain embodiments, a plurality of radiation shields 112 may be used. In such embodiments, a circular piece of metal 114 may clamp each of radiation shields 112 together. See FIG. 1D.

Radiation shield 112 may utilize lithium hydride, canned in stainless steel, as the neutron shield material and depleted uranium as the gamma shield material. The lithium hydride may be enriched in the isotope $^6$Li to reduce the gamma source from neutrons captured in the stainless steel and depleted uranium. Radiation shield 112 may also utilize three layers of lithium hydride and depleted uranium in some embodiments, with each layer of lithium hydride placed in a stainless steel can. Radiation shield 112 may contain full penetrations for heat pipes 110, plus a gap for multi-foil insulation to reduce or prevent heating of radiation shield 112 and parasitic power loss. Stated differently, radiation shield 112 may protect components of the spacecraft, including Stirling engines 116 and onboard electronics (not shown).

Figure 1D:
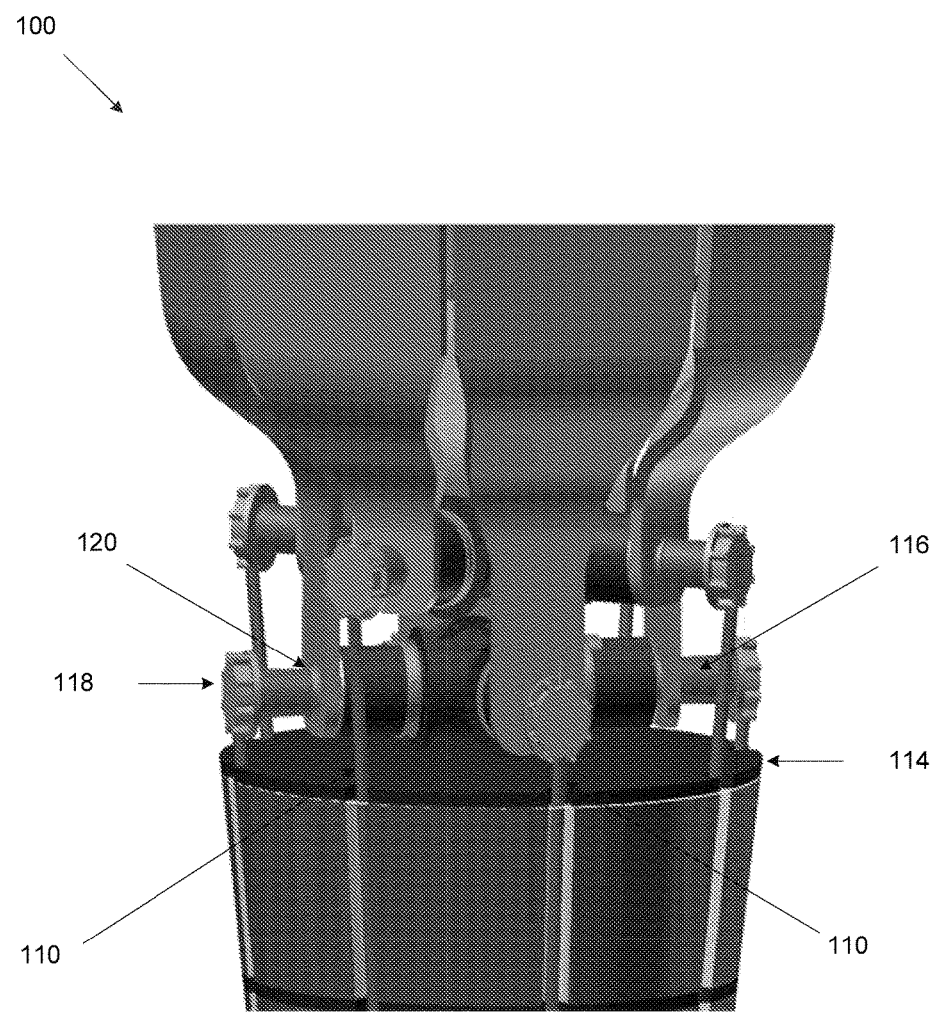
FIG. 1D illustrates a plurality of engines for the power system, according to an embodiment of the present invention.

Radiators 122 may radiate excess or rejected heat into space. As shown in FIG. 1D, radiators 122 are connected to cold sides 120 of Stirling engines 116 while heat pipes 110 are connected to hot sides 118 of Stirling engines 116. Stirling engines 116 in this embodiment may be free piston engines. Thermal energy received from hot sides 118 of Stirling engines 116 is used to generate electricity for the spacecraft in some embodiments. Excess thermal energy can be absorbed by radiators 122 through cold sides 120 of Stirling engines 116. In essence, the wasted thermal energy is rejected to radiators 122.

Figure 2A:
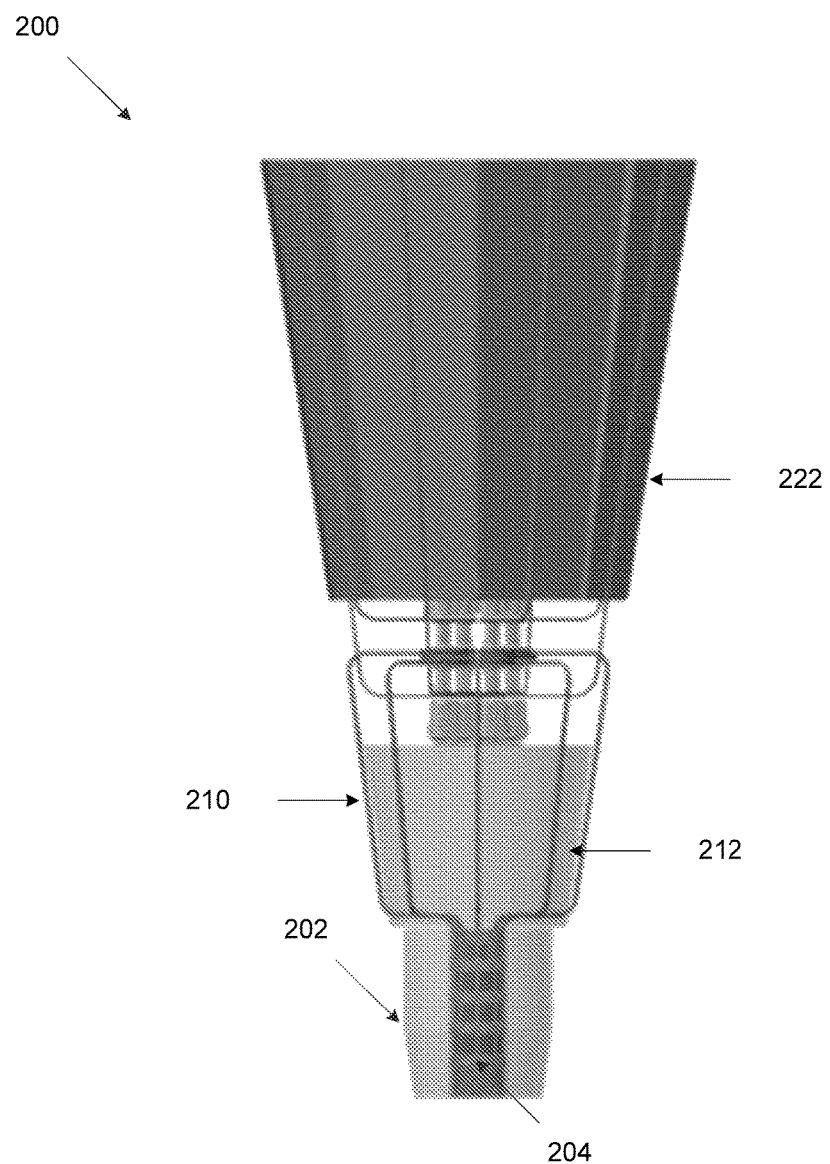
FIG. 2A illustrates a power system, according to an embodiment of the present invention.
Figure 2B:
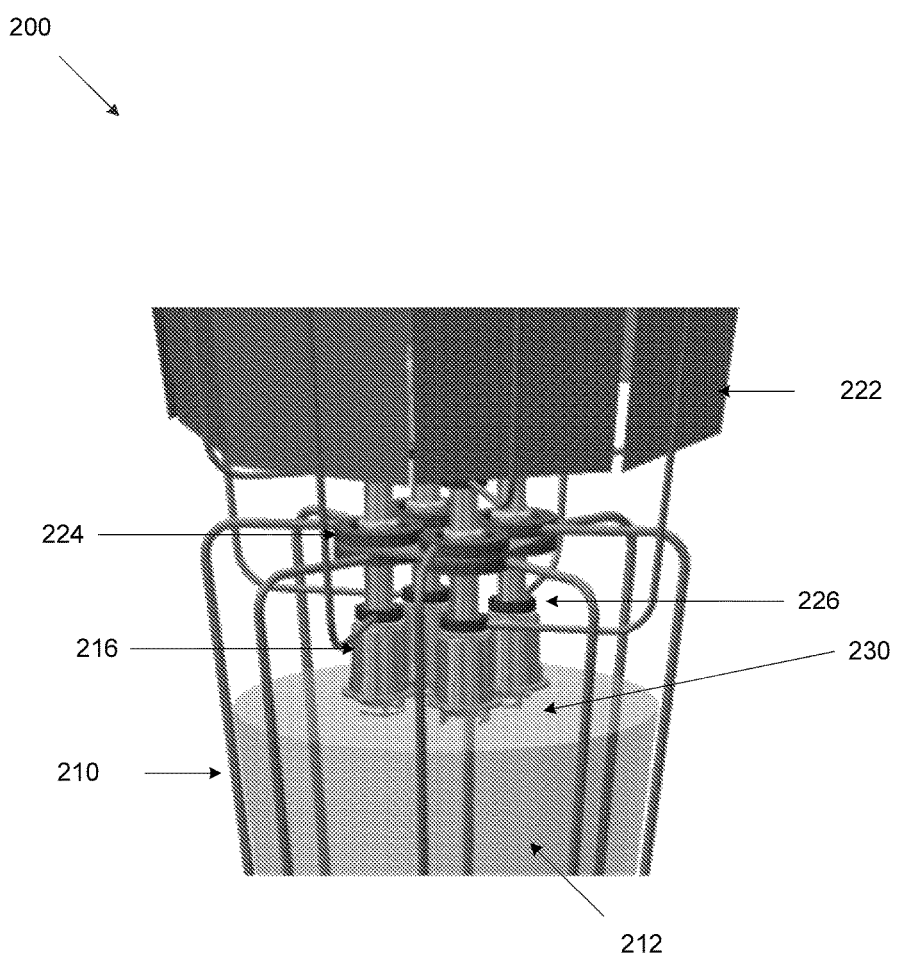
FIG. 2B illustrates a plurality of engines for the power system, according to an embodiment of the present invention.

FIG. 2A illustrates a power system 200, according to an embodiment of the present invention. Power system 200 includes similar components to power system 100 of FIG. 1A. Similar to FIG. 1D, radiators 222 are connected to cold sides 224 of Stirling engines 216 while heat pipes 110 are connected to hot sides 226 of Stirling engines 216. However, in FIG. 2A, unlike the heat pipes shown in FIGS. 1A-C, heat pipes 210 of power system 200 are located near or outside of radiation shield 212. See, for example, FIGS. 2A and 2B. As thermal energy is transferred from reactor core 204 to Stirling engines 216, heat pipes 210 may experience stress and thermal expansion. To account for these issues, heat pipes 210 are placed outside of radiation shield 212 in this embodiment.

Figure 2C:
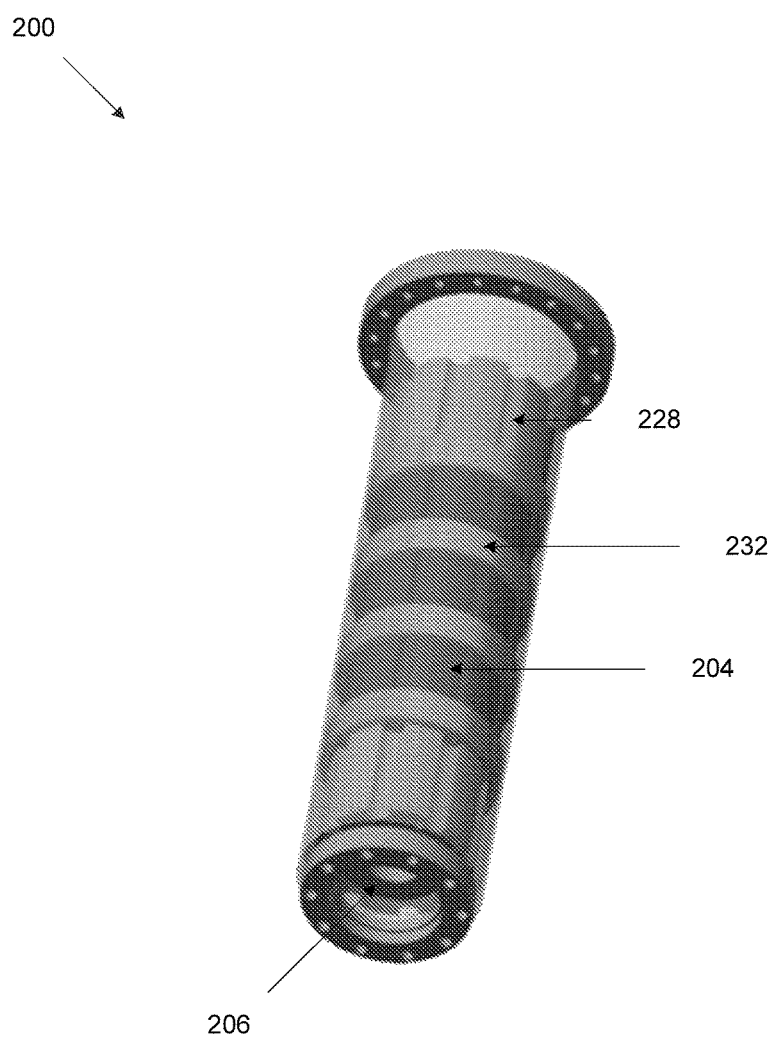
FIG. 2C illustrates a reactor of the power system, according to an embodiment of the present invention.

Also, in this embodiment, heat pipes 210 are placed near reactor core 204. See, for example, FIGS. 2A and 2C. In FIG. 2C, for example, reactor core 204 includes a plurality of grooves 228, allowing the heat pipes (not shown) to be placed close to reactor core 204. By placing the heat pipes closer to reactor core 204, the transfer of thermal energy to Stirling engines 216 is improved, thereby increasing the potential power that can be produced.

Also, in this embodiment, to secure heat pipes near reactor core 204, a plurality of rings 232 can be used. In other embodiments, other types of securing mechanisms, such as clamps, can be used to secure the heat pipes near reactor core 204. Other securing techniques may also be used. For example, the heat pipes may be welded to secure the heat pipes near reactor core 204.

Unlike Stirling engines 116 shown in FIG. 1D, Stirling engines 216 are located at or near the center of radiation shields 212. See FIGS. 2A and 2B. In this embodiment, by placing Stirling engines 216 in a vertical direction (see FIGS. 2A and 2B) instead of a horizontal direction (see FIG. 1D), sufficient space can be created to house Stirling engines 216 at or near the center of radiation shields 212. To securely mount Stirling engines 216 in pairs, Stirling engines 216 are grouped near the center of shield block 230. By mounting Stirling engines 216 in pairs, any potential vibration effects can be offset.

Certain embodiments of the present invention pertain to a power system including a nuclear reactor. The power system may generate at least 500 watts of electricity for approximately 30 years in some embodiments. To generate this electricity, the power system may utilize heat pipes to passively extract and transfer thermal energy from uranium, which serves as fuel for the nuclear reactor. The extracted thermal energy may be used to power Stirling engines. This allows the Stirling engines to power probes and other spacecraft for deep space exploration, such as exploring the outer planets of the solar system, i.e., Mars and beyond.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. An apparatus, comprising:
   a reactor configured to generate thermal energy using a reactor core, wherein the reactor core comprises a plurality of grooves placed around an external surface of the reactor core; and
   a plurality of heat pipes configured to transfer thermal energy from the reactor core to a plurality of Stirling engines to generate electricity for a spacecraft, wherein
   the plurality of heat pipes are placed within the plurality of grooves of the reactor core to increase power and are secured within the plurality of grooves by a plurality of rings or clamps, and
   each one heat pipe of the plurality of heat pipes is connected to a corresponding one Stirling engine of the plurality of Stirling engines to provide a one-to-one ratio for connecting each one heat pipe of the plurality of heat pipes with the corresponding one Stirling engine of the plurality of Stirling engine.

2. The apparatus of claim 1, wherein the reactor core comprises uranium as a fuel source.

3. The apparatus of claim 1, further comprising:
   a plurality of radiation shields positioned between the plurality of Stirling engines and the reactor core, wherein
   the plurality of radiation shields are configured to absorb gamma rays and neutrons emitted from the reactor to mitigate against damage to electronics of the spacecraft, the plurality of Stirling engines, and electronics of the plurality of Stirling engines.

4. The apparatus of claim 1, wherein the plurality of heat pipes pass through a plurality of radiation shields.

5. The apparatus of claim 4, wherein the plurality of heat pipes are embedded within the plurality of radiation shields.

6. The apparatus of claim 1, wherein the plurality of heat pipes are connected to a hot side of the plurality of Stirling engines such that the thermal energy from the reactor core can be delivered to the plurality of Stirling engines.

7. The apparatus of claim 1, further comprising:
   a plurality of radiators connected to a cold side of the plurality of Stirling engines to absorb excess thermal energy received from the reactor core.

8. The apparatus of claim 1, wherein the reactor comprises a rod configured to activate the reactor core when the rod is removed from the reactor core and deactivate the reactor core when the rod is inserted into the reactor core.

9. An apparatus, comprising:
a plurality of engines configured to produce electricity for a spacecraft; and
a plurality of heat pipes, each of the plurality of heat pipes connected to a reactor core at one end and connected to one of the plurality of engines at another end, wherein
the reactor core comprises a plurality of grooves placed around an external surface of the reactor core with the plurality of heat pipes placed within the plurality of grooves and secured by a plurality of rings or clamps,
the plurality of heat pipes are configured to transfer thermal energy from the reactor core to the plurality of engines, and
each one heat pipe of the plurality of heat pipes is connected to a corresponding one engine of the plurality of engines to provide a one-to-one ratio for connecting each one heat pipe of the plurality of heat pipes with the corresponding one engine of the plurality of engine.

10. The apparatus of claim 9, wherein the reactor core comprises uranium as a fuel source.

11. The apparatus of claim 9, wherein the plurality of heat pipes pass through a plurality of radiation shields.

12. The apparatus of claim 11, wherein the plurality of heat pipes are embedded within the plurality of radiation shields.

13. The apparatus of claim 9, wherein the plurality of heat pipes are connected to a hot side of the plurality of engines such that the thermal energy from the reactor core can be delivered to the plurality of engines.

14. The apparatus of claim 9, further comprising:
a plurality of radiation shields positioned between the plurality of Stirling engines and the reactor core, wherein
the plurality of radiation shields are configured to absorb gamma rays and neutrons emitted from the reactor to prevent damage to electronics of the apparatus, the plurality of engines, and electronics of the plurality of engines.

15. The apparatus of claim 9, further comprising:
a plurality of radiators connected to a cold side of the plurality of Stirling engines to absorb excess thermal energy from the reactor core.

16. The apparatus of claim 9, wherein the reactor comprises a rod configured to activate the reactor core when the rod is removed from the reactor core and deactivate the reactor core when the rod is inserted into the reactor core.

17. An apparatus, comprising:
a plurality of heat pipes configured to transfer thermal energy from a uranium enriched reactor to a plurality of Stirling engines, wherein
the uranium enriched reactor comprises a uranium core configured to generate thermal energy when a rod is removed from the uranium enriched reactor,
the uranium core comprises a plurality of grooves around an exterior surface of the uranium core with the plurality of heat pipes placed within the plurality of grooves and secured by a plurality of clamps or rings, and
each one heat pipe of the plurality of heat pipes is connected to a corresponding one Stirling engine of the plurality of Stirling engines to provide a one-to-one ratio for connecting each one heat pipe of the plurality of heat pipes with the corresponding one engine Stirling of the plurality of Stirling engine.

18. The apparatus of claim 17, wherein the plurality of heat pipes pass through, and are partially located outside of, a plurality of radiation shields.

* * * * *